United States Patent
Liu et al.

(10) Patent No.: US 12,138,871 B2
(45) Date of Patent: Nov. 12, 2024

(54) HIGH-TEMPERATURE HIGH-LINEAR-PRESSURE MICRO-EUTECTIC METHOD FOR ENHANCING STRENGTH OF POLYTETRAFLUOROETHYLENE (PTFE)-BASED MEMBRANE

(71) Applicants: CHINA THREE GORGES CORPORATION, Beijing (CN); CHINA THREE GORGES RENEWABLES (GROUP) CO., LTD., Beijing (CN); NANJING HAOHUI HI TECH CO., LTD., Jiangsu (CN)

(72) Inventors: Jianping Liu, Beijing (CN); Xin Xiang, Beijing (CN); Jianhua Wu, Jiangsu (CN); Yawei Zhu, Jiangsu (CN); Yajing Li, Beijing (CN); Liang Fang, Beijing (CN); Jingxin Zhao, Jiangsu (CN); Hong Wu, Jiangsu (CN); Jianping Wu, Jiangsu (CN); Hongwei Min, Beijing (CN)

(73) Assignees: CHINA THREE GORGES CORPORATION (CN); CHINA THREE GORGES RENEWABLES (GROUP) CO., LTD. (CN); NANJING HAOHUI HI TECH CO., LTD. (CN)

( * ) Notice: Subject to any disclaimer, the term of this patent is extended or adjusted under 35 U.S.C. 154(b) by 0 days.

(21) Appl. No.: 17/784,484

(22) PCT Filed: Dec. 15, 2020

(86) PCT No.: PCT/CN2020/136605
§ 371 (c)(1),
(2) Date: Jun. 10, 2022

(87) PCT Pub. No.: WO2022/011960
PCT Pub. Date: Jan. 20, 2022

(65) Prior Publication Data
US 2023/0256690 A1    Aug. 17, 2023

(30) Foreign Application Priority Data
Nov. 5, 2020 (CN) .......................... 202011221766.4

(51) Int. Cl.
B29C 71/00    (2006.01)
B29K 27/18    (2006.01)
B29L 7/00     (2006.01)

(52) U.S. Cl.
CPC ...... *B29C 71/0063* (2013.01); *B29K 2027/18* (2013.01); *B29L 2007/002* (2013.01)

(58) Field of Classification Search
CPC . B29C 71/0063; B29C 71/0072; B29C 71/02; B29C 2071/022; B29C 2071/027; C09K 5/063
See application file for complete search history.

(56) References Cited

U.S. PATENT DOCUMENTS 7,740,790 B2 *  6/2010  Onodera ................. B29C 71/02
                                                156/272.2

FOREIGN PATENT DOCUMENTS

CN    101279524 B  *  3/2011
CN    106313811 B  *  1/2018

OTHER PUBLICATIONS

CN106313811B—Machine Translation (Year: 2017).*
CN101279524B—Machine Translation (Year: 2011).*
Kitamura et al, Morphology Change in PTFE Porous Membrane Caused by Heat Treatment, Polymer Engineering and Science, Mar. 2000, vol. 40, No. 3 809 (Year: 2000).*

* cited by examiner

Primary Examiner — Yunju Kim

(57) ABSTRACT

A high-temperature high-linear-pressure micro-eutectic method for enhancing a strength of a polytetrafluoroethylene (PTFE)-based membrane is disclosed. The method comprises the following steps: pushing a PTFE-based nano functional composite membrane forwards at a speed of 6-8 m/min in a high-temperature high-linear-pressure micro-eutectic cavity with a length of 1.5 m at a temperature of 380° C., controlling a linear pressure of a surface of the PTFE-based membrane to be 50-80 N/m, and under a coiling traction of a membrane coiling roller outside the cavity, enabling membrane molecular chains to shrink and generate eutectic phases, wherein multiple micro-eutectic molecular structures are arranged in parallel, and the PTFE-based nano functional composite membrane has a density of 2.1 kg/m$^3$ and has nanoscale macromolecular aggregates and a nanoscale and micron-scale concave-convex geometrical ultramicro-structure morphology with a surface average size of 10-20 μm, a height of 5-10 μm and a spacing of 10-20 km.

5 Claims, No Drawings

HIGH-TEMPERATURE HIGH-LINEAR-PRESSURE MICRO-EUTECTIC METHOD FOR ENHANCING STRENGTH OF POLYTETRAFLUOROETHYLENE (PTFE)-BASED MEMBRANE

FIELD

The present disclosure relates to the technical field of polymer composites, particularly to a high-temperature high-linear-pressure micro-eutectic method for enhancing a strength of a polytetrafluoroethylene (PTFE)-based membrane.

BACKGROUND

A problem of icing on surfaces of wind turbine blades is quite obvious in China. The blades of wind turbine generators located in cold areas and mountain forest areas are frequently frozen from November to February and March next year, especially in cold spell in later spring in south areas, since the ambient air humidity is high, the temperature is low in winter and the temperature difference is large between day and night. When the temperature is about 0° C. and the snowfall is sticky in mixed rain and snow, a large amount of wet rain and snow mixture can be wrapped on parts exposed outside, such as the wind turbine blades, anemorumbometers and the like and has a local thickness of more than 10 cm. When the temperature decreases, the wind turbine blades begin to be iced, the output of the wind turbine blades is gradually reduced, and the normal output at the wind speed cannot be achieved. The wind turbine blades are obviously iced in the whole winter in the areas of northern Xinjiang, inner Mongolia, mountainous areas in northern Hebei, northwest Shanxi, Northeast China, Yunnan, Guizhou, Sichuan, Chongqing, Hubei, Hunan, Jiangxi and the like. In particular, the wind turbine blades in Hunan, Hubei, Guangdong, Guangxi, Jiangxi, Zhejiang, Anhui, and high-altitude mountainous areas and forest areas of Yunnan Guizhou Plateau are more serious in terms of icing time and icing degree than those in northern Xinjiang, Inner Mongolia, mountainous areas in northern Hebei, northwest Shanxi and Northeast China.

The most iced area of the wind turbine blades is concentrated on a windward side and the icing of the blade tip is more serious than that of the blade root. Due to uneven load of the icing and different thicknesses of icing sections, the original wing profiles of the blades is changed, thus the output power of the generators is further affected.

The icing of the wind turbine blades causes the following harms: increasing the static and dynamic unbalanced load, enabling the vibration of the generators to be overlarge, changing the natural frequency of the blades, increasing the fatigue load and the bending moment of the blades, and damaging the personal safety. It is important to solve the problem of icing of the blades in the world of the wind power industry. The problem is effectively solved through scientific and technological innovation to realize promotion of the wind power efficiency and safety.

Related researches on preventing and removing the icing of the wind turbine blades are never interrupted by academic and scientific research institutions and wind power industries in China. There are hundreds of published literature reports on the researches. The deicing method includes mechanical deicing, liquid deicing, coating deicing, hot gas deicing, microwave deicing, vibration deicing, electric deicing, ultrasonic deicing, etc. Wuhan shuneng develops a DSAN-S2001-DL super-hydrophobic super-self-cleaning antifouling icing-preventing bionic coating. The coating has a multistage, porous and multilayer super-hydrophobic capability of a micro-nano structure and a low-surface-energy substance modified surface rough structure, super-hydrophobic, super-self-cleaning, hydrophobic migration and hydrophobicity weakening properties, a super-hydrophobic performance in a high-humidity environment, and icing preventing or reducing, easy deicing and other pollution flashover prevention functions. The coating greatly improves an outer insulation antifouling pollution flashover prevention capability of a power grid, effectively prevents power grid accidents caused by dirt, moist air and condensation, and actively resists damage to the power grid caused by freezing rain and snow disaster weather. Yaogang, et al. in School of Electrical Engineering and Automation, Wuhan University prepares a super-hydrophobic nano composite material and studies an influence of the material on icing. A method combining high-speed stirring and ultrasonic dispersion is used, nano $SiO_{2-x}$ treated by a coupling agent is uniformly dispersed in a fluorinated organic silicon resin with a hydrophobic property, and the prepared super-hydrophobic nano composite coating is used for preventing blades from icing. Chinese patent 201610675902.4 discloses a preparation method and use of a PTFE and polyester-based composite membrane for preventing wind turbine blades from icing. The method includes steps of conducting lamination complexing using a bonding complexing agent, applying an interface adhesive and applying a photo-initiated pressure-sensitive adhesive using a pressure-sensitive adhesive. The bonding complexing agent is prepared from 3-isocyanatomethyl-3,5,5-trimethylcyclohexyl isocyanate, vinyl acetate, ethyl carbamate, alpha-linolenic acid, benzoyl peroxide, (4) ethoxylated bisphenol A dimethacrylate, etc. The photo-initiated pressure-sensitive adhesive is prepared from a poly[butyl acrylate-glycidyl methacrylate-n-butoxy methacrylamide]copolymer, butyl acrylate, (4) ethoxylated bisphenol A dimethacrylate, 4,4'-bis(diethylamino)benzophenone, dimethylformamide, etc. Chinese patent 201610670830.4 discloses a preparation method and use of a nano-modified PTFE and polyester-based composite membrane for preventing wind turbine blades from icing. The method includes steps of modifying a PTFE membrane, conducting lamination complexing and applying a photo-crosslinked adhesive. A modifier is prepared from antimony-doped tin oxide nano-crystals, nano-titanium dioxide, nano-silicon carbide, an organic fluorine waterproofing agent and pentaerythritol tri-(3-aziridinyl)-propionate. In the lamination complexing, a bonding complexing agent is prepared from 3-isocyanatomethyl-3,5,5-trimethylcyclohexyl isocyanate, vinyl acetate, ethyl carbamate, alpha-linolenic acid, (2) ethoxylated bisphenol A dimethacrylate, trimethylolpropane triacrylate and benzoyl peroxide. The photo-crosslinked adhesive is prepared from a poly[butyl acrylate-glycidyl methacrylate-n-butoxy methacrylamide]copolymer, vinyl acetate, butyl acrylate, an acrylate derivative, a photoinitiator and dimethylformamide. The method solves a problem that a modified PTFE and polyester-based composite membrane cannot be directly pasted on surfaces of the wind turbine blades with an adhesive. In "Research and analysis on anti-icing of wind turbine blades" published in Wind Energy (2016 (09)), under an effect of hot pressing and complexing process, a prepared nano modified PTFE membrane is bonded and complexed with polyester fabric at a high temperature to prepare a nano modified PTFE membrane and polyester fabric composite membrane, and the composite membrane is expected to become a new generation of anti-icing new material and technology capable of solving the world problem of wind turbine blade icing. Chinese patent 201610675902.4 discloses a preparation method and use of a PTFE and polyester-based composite membrane for preventing wind turbine blades from icing. The method includes steps of conducting lamination complexing using a bonding complexing agent, applying an interface adhesive and applying a photo-initiated pressure-sensitive adhesive using a pressure-sensitive adhesive. Chinese patent 201610452541.7 discloses a self-adhesive carbon fiber and steel fiber modified polytetrafluoroethylene material for preventing blades from icing and a preparation method thereof. Steel fibers and carbon fibers are used to improve a tensile strength and friction performance of polytetrafluoroethylene. At the same time, an improved melting method is used to sinter fine filling materials such as $SiO_2$, Al powder and the like at a high temperature on the surface of the polytetrafluoroethylene, thus a surface sintering state of the polytetrafluoroethylene is improved and a bonding strength is obviously improved. Chinese patent 201310018649.1 discloses a preparation method of a self-bonding flexible polytetrafluoroethylene (PTFE) membrane belt for preventing blades from icing. The preparation method comprises the following steps: dispersing resin with the PTFE, adding a certain amount of organic silicon and solvent oil, mixing uniformly, and curing in a dryer at 50° C. for more than 12 h; prepressing the cured powder material into a column semi-finished product; and putting into an extruder to extrude round strip materials with a diameter of 20-25 mm, putting into warm water for thermal insulation, pressing into a membrane using a large roller calender, and conducting oil removing, transverse drawing, longitudinal drawing, sizing and slitting and the like. The PTFE membrane belt product with an excellent performance in sealing industry is obtained and has a density range of 400-1,100 $g/m^3$ and a tensile strength of 15-25 MPa. Chinese patent 201720057571.8 discloses a light-operated thermal-insulated membrane for preventing blades from icing. The membrane successively consists of a PET membrane, a titanium dioxide layer, a PTFE membrane, a hot-melt adhesive layer, a PET base membrane, a scratch resistance layer and an infrared ray resistance layer from inside to outside. Chinese patent 201610990370.3 discloses a double-layer spinning membrane for preventing blades from icing and a preparation method thereof. An upper layer of the anti-icing double-layer spinning membrane is a super-hydrophobic spinning membrane coated with a silica coating and a lower layer of the anti-icing double-layer spinning membrane is a hydrophilic spinning membrane filled with deicing liquid. Liu Shengxian, et al. in Changsha University of Science and Technology defines parameters of an icing state of blades through a simulation experiment analysis of dynamic characteristics of the wind turbine blades in different icing states, obtains characteristic value indexes of the blades in the icing state through simulation calculation, and thus studies a wind turbine blade icing state diagnosis technology based on vibration detection. Goldwind Technology develops an electro-thermal deicing technical solution. Heating elements such as carbon fiber electro-thermal membranes or resistance wires are embedded in a coating of a blade. The heating elements include carbon fiber, heating resistors, metal heating meshes, conductive heating membranes, etc. The heating elements constitute an electro-thermal ice-preventing and removing system with an overheating protection converter, a power supply, etc. Therefore, ice on the surfaces of the blades is melted by an electric heating to achieve effects of preventing and removing ice. Windey develops a deicing technology by hot air generated by inputting electrical heating in a cavity of a blade. A hot air ventilation pipe is arranged in the cavity of the blade and a heating device is arranged in a hub of a wind turbine, such that the hot air or hot air heated by other radiation sources circulates in the ventilation pipe. Heat is delivered to an outer surface of the blade through a shell of the blade, such that the blade has a certain temperature and is indirectly heated under the hot air to prevent sub-cooled water drops from being frozen to achieve a purpose of preventing and removing ice.

To sum up, there are many technical methods for preventing and removing ice of wind turbine blades at home and abroad. However, practices show that among all the technical methods, some are only in basic research and some have been experimentally applied, but none of them can achieve an ideal effect of preventing and removing ice. Especially, the ice-preventing and removing method using the resistance wires and electrothermal air has an unobvious ice-preventing and removing effect, and makes the weight of each blade increased by 200 kg and the weight of the blades of the entire wind turbine generator increased by 600 kg, which greatly increases the weight load of the wind turbine blade and increases the power consumption rate of the factory by more than 8-10%. If a blade has an electrical heating fault or fails, the entire electrical heating deicing system must stop running, otherwise weight unbalance and serious barycenter offset are caused by different icing mass of the blade so as to cause faults or accidents. At the same time, there are safety hazards that the blade is easily struck by lightning.

The wind turbine blade is frozen once meets humid air, rainwater, ice and snow and sub-cooled water drops, icing is easy to form, the ice body is hard, the adhesive force is strong, and the ice is difficult to remove, and icing is particularly serious at a front edge part of the blade. It is known that a PTFE material has a low surface tension of solids and a high lubricating property. But the material still cannot resist adhesion of ice crystals on surfaces of the wind turbine blades to form icing and further cannot achieve an effect of thoroughly preventing and removing the icing on the surface of the wind turbine blades only by the single low surface tension of solids and high lubricating property. In the natural environment of a wind power plant, the blade is impacted and eroded in different degrees by dust, ice crystals, hailstones, freezing rain, rain drops and other particles carried in wind and rain and impacted by electric arcs of lightning. Particularly, the blade tip has a relatively high linear velocity in the running (the blade of a conventional 2-megawatt wind turbine generator has a length about 51 m and the blade tip has the relative linear velocity of 280-300 km/h in the running), such that the anti-icing material of the blade must have a high abrasion resistance, a toughness, an impact strength and a surface integral structural strength.

SUMMARY

In order to solve the above technical problems, the present disclosure discloses a high-temperature high-linear-pressure micro-eutectic method for enhancing a strength of a polytetrafluoroethylene (PTFE)-based membrane. The method comprises the following steps: pushing a PTFE-based nano functional composite membrane forwards in a high-temperature high-linear-pressure micro-eutectic cavity at a temperature of 70-420° C., controlling a linear pressure of a surface of the PTFE-based membrane to be 50-80 N/m, and under a coiling traction of a membrane coiling roller outside the cavity, enabling membrane molecular chains to shrink and generate eutectic phases, wherein multiple micro-eutectic molecular structures are arranged in parallel, micro-pores between the membrane molecular chains become nano-scale and ultra-micron-scale, the color of the membrane after the micro-eutectic changes from opaque milky white to transparent color with high and uniform transparency, and the PTFE-based nano functional composite membrane has nanoscale macromolecular aggregates and a nano-scale and micron-scale concave-convex geometrical ultra-micro-structure morphology with a surface average size of 10-20 μm, a height of 5-10 μm and a spacing of 10-20 km.

The high-temperature high-linear-pressure micro-eutectic method for enhancing a strength of a PTFE-based membrane, wherein the PTFE-based nano functional composite membrane is pushed forwards in the high-temperature high-linear-pressure micro-eutectic cavity at a speed of 6-8 m/min.

The high-temperature high-linear-pressure micro-eutectic method for enhancing a strength of a PTFE-based membrane, wherein the PTFE-based nano functional composite membrane has a density of 2.1 kg/m³.

The high-temperature high-linear-pressure micro-eutectic method for enhancing a strength of a PTFE-based membrane, wherein the high-temperature high-linear-pressure micro-eutectic cavity has a length of 1.5 m.

The high-temperature high-linear-pressure micro-eutectic method for enhancing a strength of a PTFE-based membrane, wherein the method comprises the following steps: pushing a PTFE-based nano functional composite membrane forwards at a speed of 8 m/min in a high-temperature high-linear-pressure micro-eutectic cavity at a temperature of 380° C., controlling a linear pressure of a surface of the PTFE-based membrane to be 60 N/m, and under a coiling traction of a membrane coiling roller outside the cavity, enabling membrane molecular chains to shrink and generate eutectic phases, wherein multiple micro-eutectic molecular structures are arranged in parallel, micro-pores between the membrane molecular chains become nano-scale and ultra-micron-scale, the color of the membrane after the micro-eutectic changes from opaque milky white to transparent color with high and uniform transparency, and the PTFE-based nano functional composite membrane has nanoscale macromolecular aggregates and a nano-scale and micron-scale concave-convex geometrical ultra-micro-structure morphology with a surface average size of 10-20 μm, a height of 5-10 μm and a spacing of 10-20 km.

The technical effects are as follows: the ultra-high-temperature ultra-high-pressure-intensity micro-eutectic method enhances an integral structural strength of the PTFE-based nano functional composite membrane, enables the membrane to have a stronger abrasion resistance, toughness and impact resistance, solves a technical problem of a reduced abrasion resistance since the PTFE-based membrane presents a fibrous structure during cracking in the high temperature after a laminar exfoliation, enables the pores of the membrane to be small under the action of temperatures and linear pressures, improves transparency and enables the transparency to be uniform. The PTFE-based nano functional composite membrane has an ultra-micro structure surface morphology, and has the high abrasion resistance, toughness and impact resistance. The surface strength of the PTFE-based nano functional composite membrane with an anti-icing function used in the wind turbine blade is enhanced, an integral fixing effect is achieved, the integral bearing capacity and the erosion resistance of the blade are improved, the potential safety hazard of the blade suffered from different degrees of impact and erosion of particles such as dust, ice crystals, hailstones, freezing rain, raindrops and the like carried by wind and rain, and electric arc impact of lightning is eliminated, and the capability of the blade for resisting long-term erosion of foreign objects is enhanced. Therefore, the blade is protected doubly, the blade aging and cracking are avoided, and the service life of the blade is prolonged.

DETAILED DESCRIPTION

The example provides a high-temperature high-linear-pressure micro-eutectic method for enhancing a strength of a PTFE-based membrane, wherein the method comprises the following steps: pushing a PTFE-based nano functional composite membrane forwards at a speed of 8 m/min in a high-temperature high-linear-pressure micro-eutectic cavity with a length of 1.5 m at a temperature of 380° C., controlling a linear pressure of a surface of the PTFE-based membrane to be 60 N/m, and under a coiling traction of a membrane coiling roller outside the cavity, enabling membrane molecular chains to shrink and generate eutectic phases, wherein multiple micro-eutectic molecular structures are arranged in parallel, the PTFE-based nano functional composite membrane has a density of 2.1 kg/m³, micro-pores between the membrane molecular chains become nano-scale and ultra-micron-scale, the color of the membrane after the micro-eutectic changes from opaque milky white to transparent color with high and uniform transparency, and the PTFE-based nano functional composite membrane has nanoscale macromolecular aggregates and a nano-scale and micron-scale concave-convex geometrical ultra-micro-structure morphology with a surface average size of 10-20 μm, a height of 5-10 μm and a spacing of 10-20 μm.

5 PTFE-based membrane samples obtained in the method are subjected to various performance tests and the results are as follows: (1) the membrane has an average thickness of 100 μm; (2) the membrane has an average weight of 210 g/m²; (3) the membrane has a peel force of 50 N and a 180° peel strength of 1,000 N/m; (4) the membrane has an average tensile strength of 25 Mpa before and after aging and an average elongation rate of more than 90%, and shows no aging by a xenon lamp aging test, a freeze-thaw cycle performance test (a temperature of −60° C. to 150° C. and a humidity of 5-98%), an ozone aging test, an ultraviolet aging test and an artificial atmosphere corrosion and sea salt solution soaking test for 14,400 h; (5) the membrane does not have a rough surface and is free of damage to expose a substrate after 37 times/min of reciprocating friction for 40,000 times using a method in GB/T 9266-2009 "Determination of scrub resistance of film of architectural paints and coatings", and thus has a strong abrasion resistance; (6) a dynamic wind pressure test platform is used to simulate a wind speed of 36.9 m/s (12-grade typhoon) to carry out a dynamic wind pressure test on a rain wash resistance, and the membrane does not have a rough surface and has an excellent rain erosion resistance after subjected to a strong-wind-speed water-blowing test for 1,000 h; (7) after tested by a scanning electron microscope (SEM), the surface morphology of the membrane shows micron-scale micro concave-convex surface structures with an average size of 20-40 m, a height of 10-20 μm and a spacing of 30-50 μm uniformly distributed in a warp and weft direction; (8) a contact angle of water drops on the surface of the membrane measured by a water contact angle tester is between 115.89°-

125.46°; and (9) an average membrane surface roughness measured by a surface roughness meter is 0.18 m.

In conclusion, the present disclosure solves a problem that the PTFE and polyester composite membrane cannot be directly pasted on surfaces of wind turbine blades with an adhesive. The PTFE is prepared into a membrane material with a multi-nano-scale and micron-scale concave-convex geometrical ultra-micro-structure morphology. A low surface tension of solids and a high lubricating non-adhesive performance of the PTFE are combined to form a PTFE nano functional composite membrane with double functions of preventing adhesion and preventing and removing ice. The composite membrane is pasted on the surfaces of the wind turbine blades, improves a peel strength, can be used for anti-icing of various types of the wind turbine blades, and can really resist icing of rain and snow on the surfaces of the wind turbine blades. The method enhances an integral structural strength of the PTFE-based nano functional composite membrane. Therefore, the PTFE-based nano functional composite membrane used in the blade surfaces of various wind turbine generators has a higher abrasion resistance, corrosion resistance and aging resistance, the integral surface strength of the blades is enhanced, the integral bearing capacity and the erosion capacity of foreign objects of the blades are improved, and potential safety hazards of blade aging, cracking and the like are eliminated. The method can be directly used in preparing the PTFE-based membrane material for preventing marine fouling organism adhesion of steel pipe piles of offshore wind power and offshore platforms, snow accumulation and icing-preventing high-voltage transmission towers and snow accumulation and icing-preventing of (stayed-cable and suspension) bridges.

The disclosure may have other implementations in addition to those described above. All technical solutions formed by equivalent replacements or equivalent transformations should fall within the protection scope of the present disclosure.

The invention claimed is:

1. A high-temperature high-linear-pressure micro-eutectic method for enhancing a strength of a polytetrafluoroethylene (PTFE)-based membrane, comprising the following steps:
    pushing a PTFE-based nano functional composite membrane forwards in a high-temperature high-linear-pressure micro-eutectic cavity at a temperature of 70-420° C.,
    controlling a linear pressure of a surface of the PTFE-based membrane to be 50-80 N/m, and
    under a coiling traction of a membrane coiling roller outside the cavity, enabling membrane molecular chains to shrink and generate eutectic phases, wherein multiple micro-eutectic molecular structures are arranged in parallel, micro-pores between the membrane molecular chains become nano-scale and micron-scale, a color of obtained PTFE-based nano functional composite membrane after the micro-eutectic changes from opaque milky white to transparent color with high and uniform transparency, and the obtained PTFE-based nano functional composite membrane has nanoscale macromolecular aggregates and a nano-scale and micron-scale concave-convex geometrical microstructure morphology with a surface average size of 10-20 μm, a height of 5-10 μm and a spacing of 10-20 μm.

2. The high-temperature high-linear-pressure micro-eutectic method for enhancing a strength of a PTFE-based membrane according to claim 1, wherein the PTFE-based nano functional composite membrane is pushed forwards in the high-temperature high-linear-pressure micro-eutectic cavity at a speed of 6-8 m/min.

3. The high-temperature high-linear-pressure micro-eutectic method for enhancing a strength of a PTFE-based membrane according to claim 1, wherein the PTFE-based nano functional composite membrane has a density of 2.1 $kg/m^3$.

4. The high-temperature high-linear-pressure micro-eutectic method for enhancing a strength of a PTFE-based membrane according to claim 1, wherein the high-temperature high-linear-pressure micro-eutectic cavity has a length of 1.5 m.

5. The high-temperature high-linear-pressure micro-eutectic method for enhancing a strength of a PTFE-based membrane according to claim 1, wherein,
    pushing the PTFE-based nano functional composite membrane forwards at a speed of 8 m/min in the high-temperature high-linear-pressure micro-eutectic cavity at a temperature of 380° C.,
    controlling the linear pressure of the surface of the PTFE-based membrane to be 60 N/m.

* * * * *